United States Patent
Morikawa (10) Patent No.: US 10,589,211 B2
(45) Date of Patent: Mar. 17, 2020

(54) CYLINDRICAL AIR CLEANER FOR INTERNAL COMBUSTION ENGINE

(71) Applicant: TOYOTA BOSHOKU KABUSHIKI KAISHA, Aichi-ken (JP)

(72) Inventor: Hiroaki Morikawa, Kitanagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 113 days.

(21) Appl. No.: 15/801,956

(22) Filed: Nov. 2, 2017

(65) Prior Publication Data

US 2018/0147525 A1 May 31, 2018

(30) Foreign Application Priority Data

Nov. 30, 2016 (JP) .................................. 2016-233023

(51) Int. Cl.
*B01D 53/04* (2006.01)
*B01D 46/24* (2006.01)
(Continued)

(52) U.S. Cl.
CPC ..... *B01D 53/0415* (2013.01); *B01D 46/0036* (2013.01); *B01D 46/2411* (2013.01);
(Continued)

(58) Field of Classification Search
CPC ............ B01D 46/0002; B01D 46/0036; B01D 46/444; B01D 46/521; B01D 2279/60;
(Continued)

(56) References Cited

U.S. PATENT DOCUMENTS 3,873,287 A * 3/1975 Barnebey ........... B01D 46/0013
96/129
4,886,599 A * 12/1989 Bachmann ............. B01D 27/02
210/287
(Continued)

FOREIGN PATENT DOCUMENTS

| CN | 104265518 | 1/2015 |
| JP | 2001-123897 | 5/2001 |
| JP | 2013-130093 | 7/2013 |

OTHER PUBLICATIONS

Office Action issued in China Counterpart Patent Appl. No. 201711096535.3, dated Aug. 14, 2019, along with an English translation thereof.

*Primary Examiner* — Minh Chau T Pham
(74) *Attorney, Agent, or Firm* — Greenblum & Bernstein, P.L.C.

(57) ABSTRACT

A cylindrical air cleaner for an internal combustion engine includes a cylindrical housing including a circumferential wall having an inlet, a top wall having an outlet, and a bottom wall opposed to the top wall. There is a tubular filter element accommodated in the housing. A planar adsorbent filter to adsorb evaporated fuel of the internal combustion engine is located at an inner side of the filter element and extends in an axial direction of the filter element. The adsorbent filter includes a basal end portion fixed to an inner surface of the bottom wall. An inner surface of the filter element is spaced apart from each of opposite planes of the adsorbent filter by a gap that allows air to reach the outlet without passing through the adsorbent filter.

7 Claims, 5 Drawing Sheets

(51) Int. Cl.
*B01D 46/00* (2006.01)
*B01D 46/52* (2006.01)
*F02M 35/02* (2006.01)
*F02M 35/024* (2006.01)

(52) U.S. Cl.
CPC ......... *B01D 46/521* (2013.01); *F02M 35/021* (2013.01); *F02M 35/0245* (2013.01); *F02M 35/02425* (2013.01); *F02M 35/02483* (2013.01); *B01D 2253/102* (2013.01); *B01D 2257/702* (2013.01); *B01D 2259/4516* (2013.01); *B01D 2279/60* (2013.01)

(58) Field of Classification Search
CPC ....... F02M 35/02416; F02M 35/02483; F02M 35/02491; F02M 35/0218; F02M 35/10386
USPC ............... 55/330, 385.3, 482, 498, 502, 521; 96/108, 135, 147, 121, 139, 117.5; 123/198 E, 518, 519
See application file for complete search history.

(56) References Cited

U.S. PATENT DOCUMENTS

| | | | | |
|---|---|---|---|---|
| 5,338,450 | A * | 8/1994 | Maurer | B01D 53/0446 210/286 |
| 6,290,739 | B1 * | 9/2001 | Gieseke | B01D 46/0004 123/198 E |
| 7,276,098 | B2 * | 10/2007 | Koslow | B01D 46/0012 55/385.3 |
| 7,311,747 | B2 * | 12/2007 | Adamek | B01D 29/21 55/498 |
| 7,610,904 | B2 * | 11/2009 | Treier | B01D 46/0036 123/516 |
| 7,691,188 | B2 * | 4/2010 | Weber | F02M 25/0854 55/498 |
| 8,110,016 | B2 * | 2/2012 | McCollam | B01D 29/00 210/450 |
| 8,821,619 | B2 * | 9/2014 | McKenna | B01D 53/0415 55/498 |
| 2006/0107836 | A1 * | 5/2006 | Maier | B01D 46/0024 96/134 |
| 2008/0257160 | A1 * | 10/2008 | Yoshida | B01D 46/0036 96/139 |
| 2009/0019823 | A1 * | 1/2009 | Juliar | B01D 46/0004 55/472 |
| 2014/0157738 | A1 * | 6/2014 | Eberle | B01D 46/0005 55/482 |
| 2018/0149117 | A1 * | 5/2018 | Morikawa | B01D 46/2411 |
| 2018/0149118 | A1 * | 5/2018 | Morikawa | B01D 46/2411 |
| 2018/0149119 | A1 * | 5/2018 | Morikawa | B01D 46/0002 |

* cited by examiner

CYLINDRICAL AIR CLEANER FOR INTERNAL COMBUSTION ENGINE

BACKGROUND OF THE INVENTION

The present invention relates to a cylindrical air cleaner arranged in an intake air passage of an internal combustion engine.

A prior art cylindrical air cleaner for an internal combustion engine includes a cylindrical housing and a tubular filter element accommodated in the housing. The housing includes a circumferential wall having an inlet, a top wall having an outlet, and a bottom wall opposed to the top wall.

The tubular filter element includes a pleated filter portion, which is formed by pleating a filter medium sheet, and two sealing portions, which are arranged on opposite ends of the filter portion in an axial direction to seal between the top wall and the bottom wall of the housing.

Japanese Laid-Open Patent Publication No. 2001-123897 discloses a filter element that includes a filter portion and an inner tube, which is arranged at an inner side of the filter portion. The inner tube includes an adsorbent, which adsorbs evaporated fuel, and has a number of air holes.

SUMMARY OF THE INVENTION

The filter element described in Japanese Laid-Open Patent Publication No. 2001-123897 has the drawback of increasing the airflow resistance. The reason is that although the inner tube has a number of air holes, the inner tube blocks a passage through which the air flows. Therefore, there is room for improvement to reduce the air pressure loss.

It is an object of the present invention to provide a cylindrical air cleaner for an internal combustion engine that reduces air pressure loss.

One aspect of the present invention is a cylindrical air cleaner for an internal combustion engine arranged in an intake air passage of the internal combustion engine. The cylindrical air cleaner includes a cylindrical housing and a tubular filter element accommodated in the housing. The housing includes a circumferential wall having an inlet, a top wall having an outlet, and a bottom wall opposed to the top wall. The housing comprises a case including the bottom wall and a cap including the top wall. The cap is coupled to the case in a removable manner. The case includes a planar adsorbent filter to adsorb evaporated fuel of the internal combustion engine. The adsorbent filter includes a basal end portion fixed to an inner surface of the bottom wall. The adsorbent filter is located at an inner side of the filter element and extends in an axial direction of the filter element. An inner surface of the filter element is spaced apart from each of opposite planes of the adsorbent filter by a gap that allows air to reach the outlet without passing through the adsorbent filter.

Other aspects and advantages of the embodiments will become apparent from the following description, taken in conjunction with the accompanying drawings, illustrating by way of example the principles of the invention.

DETAILED DESCRIPTION OF THE PREFERRED EMBODIMENTS

First Embodiment

A first embodiment will now be described with reference to FIGS. 1 to 5.

Figure 1:
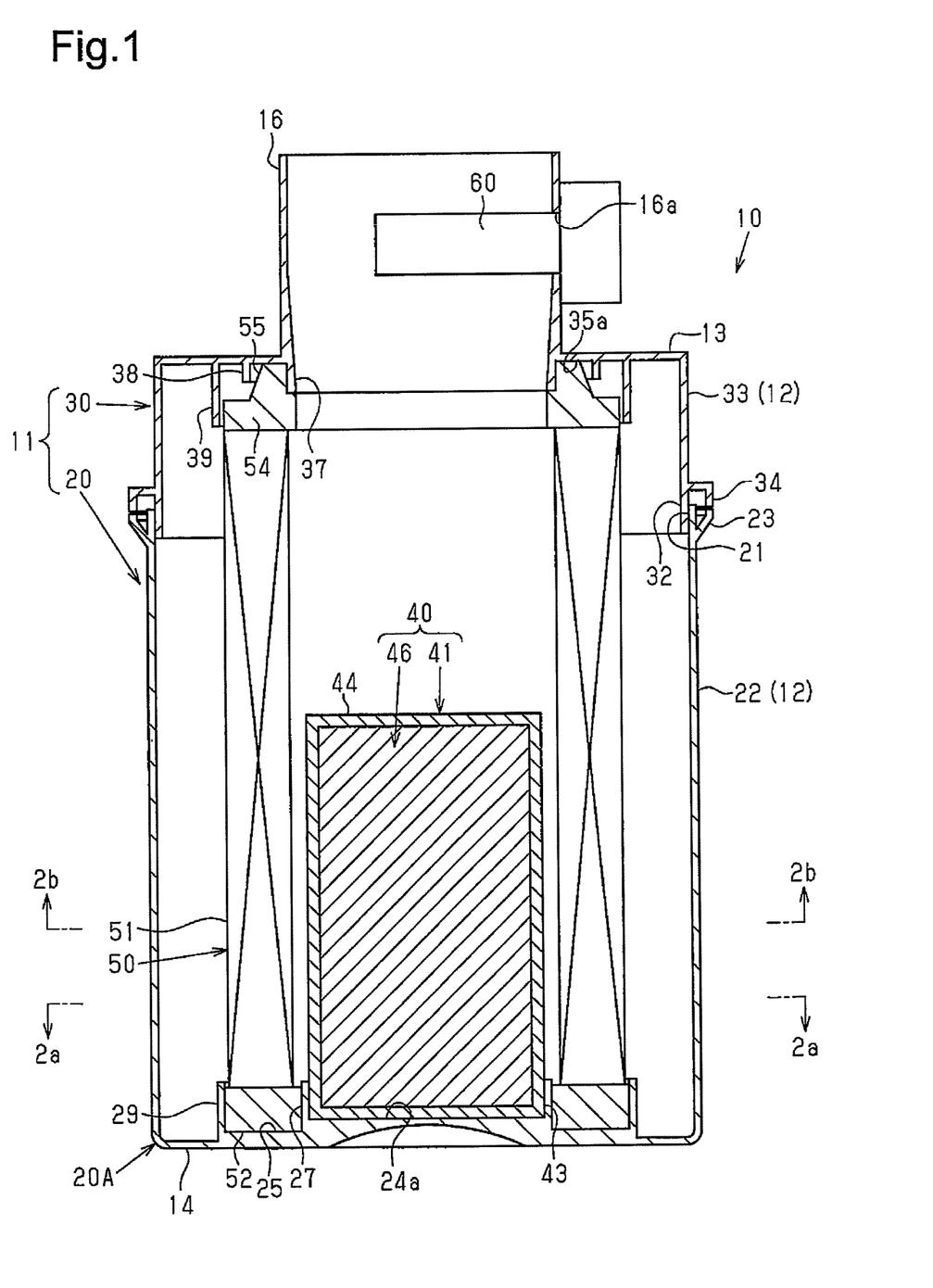
FIG. 1 is a vertical cross-sectional view showing a first embodiment of a cylindrical air cleaner.
Figure 2A:
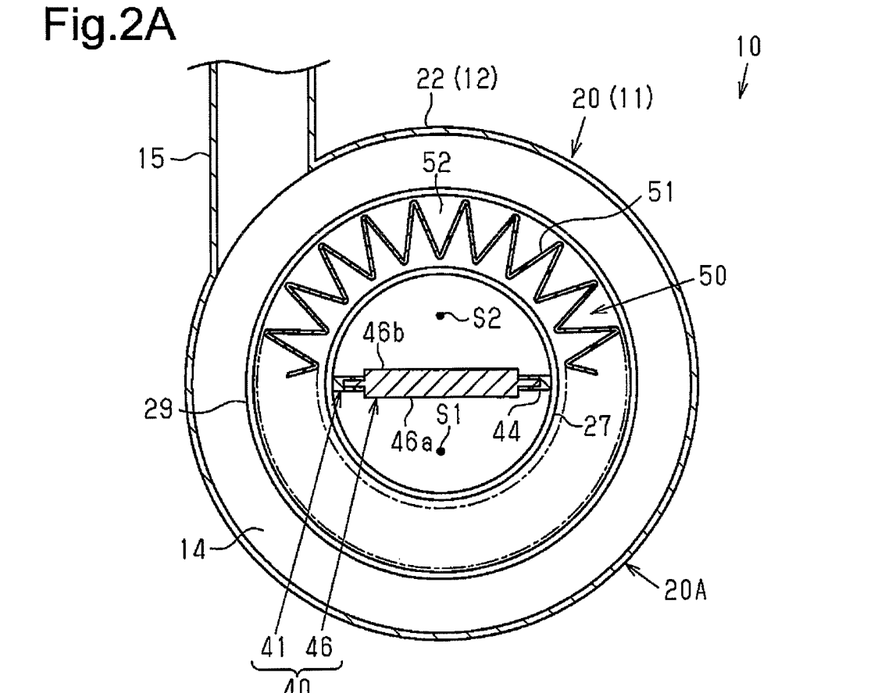
FIG. 2A is a cross-sectional view taken along line 2a-2a in FIG. 1.
Figure 2B:
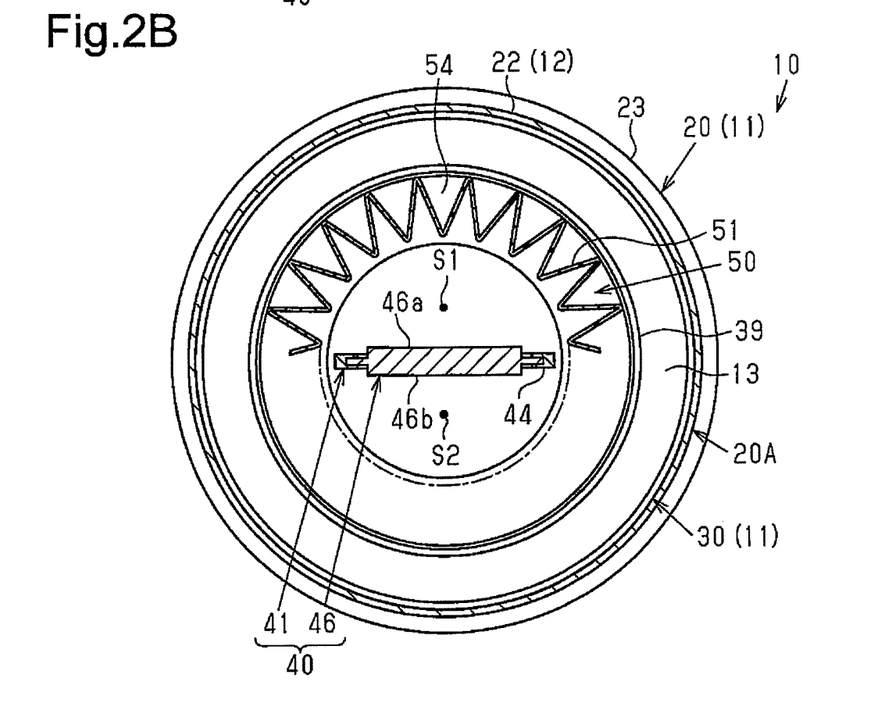
FIG. 2B is a cross-sectional view taken along line 2b-2b in FIG. 1.

As shown in FIGS. 1, 2A, and 2B, a cylindrical air cleaner (hereafter, referred to as air cleaner 10), which is arranged in an intake air passage of an internal combustion engine, includes a cylindrical housing 11. The housing 11 includes a circumferential wall 12 having an inlet 15, a top wall 13 having an outlet 16, and a bottom wall 14 opposed to the top wall 13. A tubular filter element 50 is accommodated in the housing 11.

Filter Element 50

As shown in FIGS. 1, 2A, and 2B, the filter element 50 includes a pleated tubular filter portion 51, which is formed by pleating a filter medium sheet such as a non-woven fabric or filter paper, a first sealing portion 52, and a second sealing portion 54, each of which is disk-shaped and has a center hole. The first sealing portion 52 and the second sealing portion 54 are located on one end and another end of the filter portion 51 in an axial direction.

As shown in FIG. 1, the first sealing portion 52 includes a planar end surface that is orthogonal to the axis. The second sealing portion 54 includes an end surface formed integrally with an annular projection 55.

Housing 11

The housing 11 includes a case 20 and a cap 30 coupled to the case 20 in a removable manner. The case 20 includes a portion of the circumferential wall 12 and the bottom wall 14. The cap 30 includes another portion of the circumferential wall 12 and the top wall 13.

The case 20 and the cap 30 will now be described in detail.

Case 20

As shown in FIGS. 1, 2A, and 2B, the case 20 includes a case body 20A and an adsorbent filter assembly 40.

The case body 20A includes a tubular case circumferential wall 22, which defines an opening 21. The rim of the case circumferential wall 22 defining the opening 21 includes a case flange 23 extending throughout the circumference.

Figure 3:
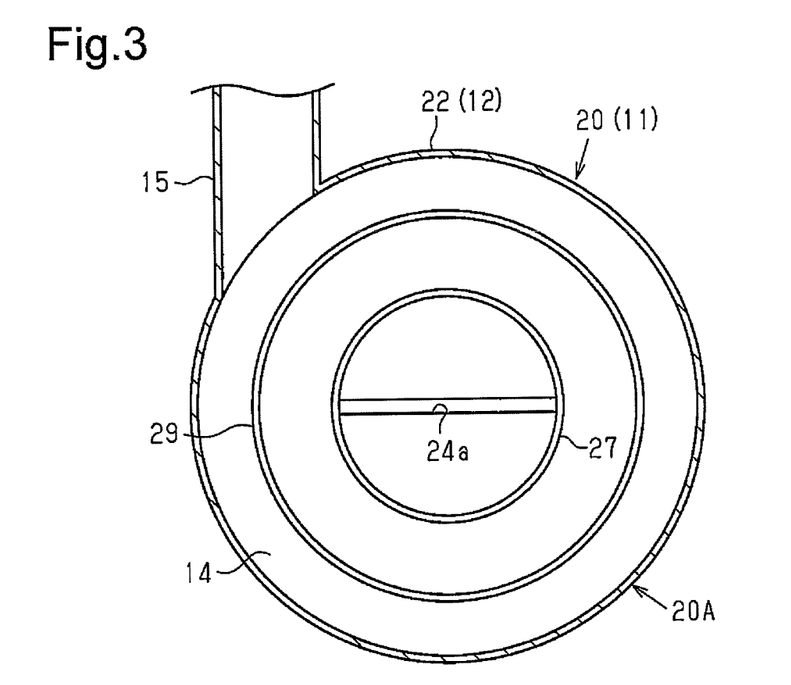
FIG. 3 is a cross-sectional view corresponding to FIG. 2A showing a case body with an adsorbent filter assembly removed.

As shown in FIGS. 1, 2A, and 3, the case body 20A includes the bottom wall 14 and the tubular inlet 15, which projects from an outer surface of the case circumferential wall 22 and communicates the inside of the case 20 to the outside of the case 20.

The inner surface of the bottom wall 14 includes an inner projection 27 and an outer projection 29, which are annular and concentric with each other about the axis of the case body 20A. The inner surface of the bottom wall 14, the outer circumferential surface of the inner projection 27, and the inner circumferential surface of the outer projection 29 define an annular recess 25. The first sealing portion 52 of the filter element 50 is fitted into the recess 25. The first sealing portion 52 includes an end surface that contacts the inner surface of the bottom wall 14 in the recess 25 to provide a seal between the case 20 and the first sealing portion 52.

As shown in FIGS. 1 and 3, the inner surface of the bottom wall 14 includes an insertion recess 24a at an inner side of the inner projection 27. The insertion recess 24a radially extends through the center of the bottom wall 14. The adsorbent filter assembly 40 has a basal end portion, which is inserted into and fixed to the insertion recess 24a and will be described later.

The case 20 is formed from a rigid resin material.

As shown in FIGS. 1, 2A, and 2B, the adsorbent filter assembly 40 includes an adsorbent filter 46, which adsorbs evaporated fuel of the internal combustion engine, and a holding member 41, which is fixed to the insertion recess 24a of the case body 20A and holds the adsorbent filter 46.

Although not shown in the drawings, the adsorbent filter 46 has the form of a rectangular plate and includes an adsorbent layer formed from activated carbon particles, two non-woven sheets holding the adsorbent layer in between, two glass fiber nets holding the two non-woven sheets in between, and two resin nets holding the two glass fiber nets in between. The entire edges of the adsorbent filter 46 are thermally compressed to define an edge portion 47.

Figure 4:
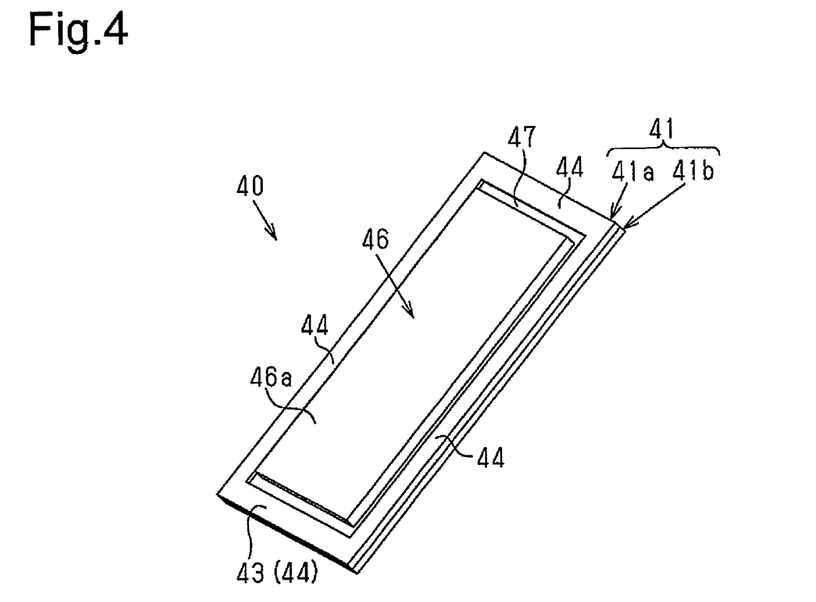
FIG. 4 is a perspective view showing a first embodiment of an adsorbent filter assembly.

As shown in FIGS. 1 and 4, the holding member 41 of the present embodiment includes a rectangular frame 44.

Figure 5:
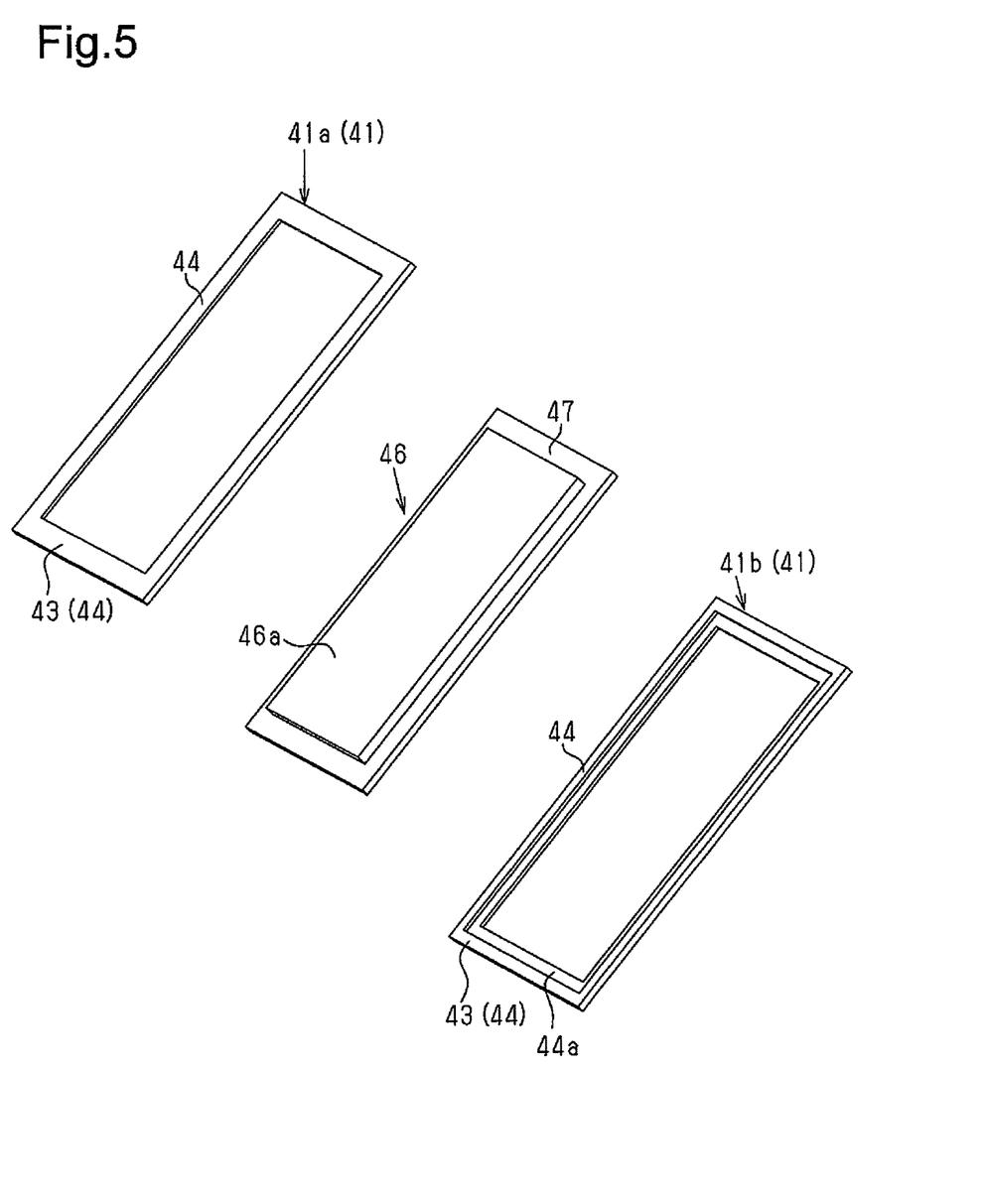
FIG. 5 is an exploded perspective view showing the adsorbent filter assembly of the first embodiment including a first half body, a second half body, and an adsorbent filter.

As shown in FIGS. 4 and 5, the holding member 41 of the present embodiment includes a first half body 41a and a second half body 41b, which are formed from a rigid resin material separately from each other.

As shown in FIG. 5, the half bodies 41a, 41b have surfaces opposed to each other, each of which includes an accommodation portion 44a extending throughout inner edges of the corresponding one of the half bodies 41a, 41b to accommodate the edge portion 47 of the adsorbent filter 46.

With the edge portion 47 of the adsorbent filter 46 held between the accommodation portions 44a of the half bodies 41a, 41b, the half bodies 41a, 41b are bonded to each other, for example, through vibration welding, thereby forming the adsorbent filter assembly 40.

As shown in FIG. 1, the holding member 41 includes a basal end portion (portion of frame 44, hereafter, also referred to as "fixing portion 43"), which is fixed when inserted into the insertion recess 24a of the bottom wall 14. The fixing portion 43 and the bottom wall 14 are bonded to each other, for example, through vibration welding.

Cap 30

As shown in FIG. 1, the cap 30 includes a tubular cap circumferential wall 33, which defines an opening 32, the top wall 13, and the tubular outlet 16, which projects from an outer surface of the top wall 13 and communicates the inside of the cap 30 to the outside of the cap 30. The rim of the cap circumferential wall 33 includes a cap flange 34, which extends throughout the circumference.

The inner surface of the top wall 13 includes an inner projection 37, an intermediate projection 38, and an outer projection 39, which are annular and concentric with each other about the axis of the cap 30. The inner surface of the top wall 13, the outer surface of the inner projection 37, and the inner surface of the intermediate projection 38 define an annular recess 35a. The annular projection 55 of the second sealing portion 54 of the filter element 50 is fitted into the recess 35a. The annular projection 55 includes an end surface that contacts the inner wall (hereafter, also referred to as sealing surface) of the top wall 13 in the recess 35a to provide a seal between the cap 30 and the second sealing portion 54.

The outer projection 39 extends longer than the inner projection 37 and the intermediate projection 38 toward the opening 32. The inner surface of the outer projection 39 is spaced apart from and opposed to the outer circumferential surface of the second sealing portion 54 in the radial direction.

The cap 30 is formed from a rigid resin material.

As shown in FIGS. 1 and 2B, the adsorbent filter 46 extends through the axis of the filter element 50 in the axial direction of the filter element 50. The adsorbent filter assembly 40 includes a distal end, which is located in the case 20.

As shown in FIGS. 2A and 2B, the adsorbent filter 46 includes opposite planes 46a, 46b, which are spaced apart from the inner surface of the filter portion 51 of the filter element 50 by gaps S1, S2. The gaps S1, S2 allow air to reach the outlet 16 without passing through the adsorbent filter 46.

As shown in FIG. 1, the outlet 16 includes an attachment slot 16a used for attachment of an airflow meter 60, which detects the intake air amount of the internal combustion engine.

In the present embodiment, the adsorbent filter 46 is arranged parallel to a projection direction of the airflow meter 60, which projects through the attachment slot 16a into the outlet 16.

The first embodiment of the cylindrical air cleaner for an internal combustion engine has the advantages described below.

(1) The planar adsorbent filter 46, which adsorbs evaporated fuel of the internal combustion engine, is located at the inner side of the filter element 50 and extending in the axial direction of the filter element 50. The inner surface of the filter element 50 is spaced apart from the opposite planes 46a, 46b of the adsorbent filter 46 by the gaps S1, S2. The gaps S1, S2 allow air to reach the outlet 16 without passing through the adsorbent filter 46.

With this structure, when air flows through the filter element 50 into the inner side of the filter element 50, the air is allowed to reach the outlet 16 without flowing through the adsorbent filter 46. This limits an increase in the flow resistance of the air, flowing through the inner side of the filter element 50, which would be caused by the adsorbent filter 46. Thus, the air pressure loss is reduced.

(2) The housing 11 includes the case 20, which includes the bottom wall 14, and the cap 30, which includes the top wall 13 and is coupled to the case 20 in a removable manner. The basal end portion of the adsorbent filter 46 is fixed to the inner surface of the bottom wall 14.

With this structure, the adsorbent filter 46 is coupled to the bottom wall 14 of the case 20. Thus, the same case 20 may be used on different caps having different diameters of outlets 16. Therefore, the case 20 may be shared.

(3) The distal end of the adsorbent filter 46 is located in the case 20. More specifically, the adsorbent filter 46 does not extend into the cap 30. This further limits disturbance of the air flow, which would be caused by the adsorbent filter 46.

(4) The case 20 includes the case body 20A, which includes the bottom wall 14, and the adsorbent filter assembly 40, which includes the adsorbent filter 46 and the fixing portion 43 arranged integrally with the adsorbent filter 46. The fixing portion 43 is fixed to the inner surface of the bottom wall 14.

In this structure, the adsorbent filter assembly 40 includes the adsorbent filter 46 and the fixing portion 43, and the case body 20A includes the bottom wall 14, to which the fixing portion 43 is fixed. Thus, when the air cleaner 10 is destined for a location that requires the adsorbent filter 46, the case body 20A coupled with the adsorbent filter assembly 40 is used as the case of the air cleaner 10. When the air cleaner 10 is destined for a location that does not require the adsorbent filter 46, only the case body 20A, without the adsorbent filter assembly 40 attached, may be used as the case of the air cleaner 10. This simplifies the structure of the adsorbent filter assembly 40. Also, the same case body 20A may be used regardless of whether or not the adsorbent filter 46 is coupled.

(5) The adsorbent filter 46 is arranged parallel to the projection direction of the airflow meter 60, which projects through the attachment slot 16a into the outlet 16.

With this structure, when air flows through the gaps S1, S2 between the filter element 50 and the opposite planes 46a, 46b of the adsorbent filter 46 into the outlet 16, the air is less disturbed by the airflow meter 60, which projects into the outlet 16. This reduces variations in detection values of the airflow meter 60.

Second Embodiment

A second embodiment of an adsorbent filter assembly 40 will now be described focusing on the differences from the first embodiment with reference to FIG. 6.

Figure 6:
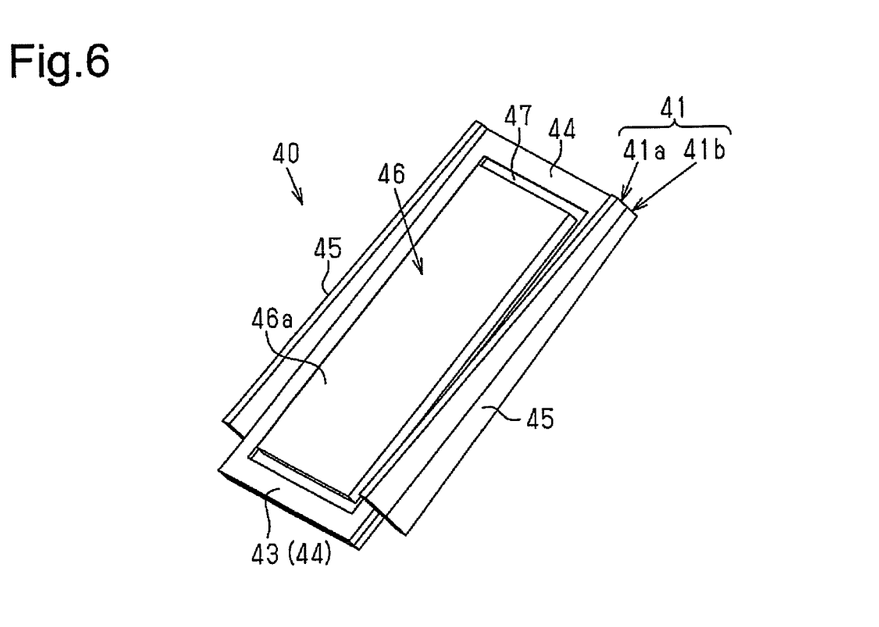
FIG. 6 is a perspective view showing a second embodiment of an adsorbent filter assembly.

As shown in FIG. 6, the frame 44 includes two pillars 45 at portions that are not inserted into the insertion recess 24a. The two pillars 45 extend in the axial direction of the filter element 50. Each pillar 45 tapers in width as the pillar 45 extends distally from the fixing portion 43. A basal end of the pillar 45 is fixed to the inner surface of the case body 20A.

The second embodiment of the cylindrical air cleaner for an internal combustion engine has the advantages described below in addition to the advantages (1) through (5) of the first embodiment.

(6) The adsorbent filter assembly 40 includes the frame 44, which is disposed about a periphery of the adsorbent filter 46. The frame 44 includes the two pillars 45 extending in the axial direction of the filter element 50. Each of the two pillars 45 tapers in width as the pillar 45 extends distally from the fixing portion 43.

The arrangement of the pillars 45 increases the rigidity of the adsorbent filter assembly 40.

Additionally, the two pillars 45 of the frame 44 taper in width as they extend distally. Thus, when the adsorbent filter assembly 40 is fixed to the case body 20A and then inserted into the filter element 50, the interference with the pillars 45 is limited. Therefore, the case 20 may be easily coupled to the cap 30 to which the filter element 50 is attached.

Additionally, as compared to a structure in which the entire width of each pillar 45 is large and constant, the pillars 45 reduce the disturbance of the flow of air passing through the inner side of the filter element 50. Thus, the air pressure loss is reduced.

MODIFIED EXAMPLES

The above embodiments may be modified as follows.

The adsorbent filter 46 may be arranged so that the opposite planes 46a, 46b of the adsorbent filter 46 are at an angle with the projection direction of the airflow meter 60.

The layer structure of the adsorbent filter 46 may be changed, for example, by omitting the glass fiber nets. The material forming the adsorbent layer only needs to adsorb evaporated fuel. Thus, an adsorbent differing from activated carbon such as zeolite may be used.

The adsorbent filter 46 may be arranged so as not to extend through the axis of the filter element 50.

The adsorbent filter 46 may be inclined from the axial direction of the filter element 50.

The shape of the adsorbent filter 46 may be changed from the rectangular plate to, for example, a trapezoidal plate.

The process for fixing the fixing portion 43 of the adsorbent filter assembly 40 to the bottom wall 14 of the case body 20A is not limited to vibration welding. For example, adhesion or snap-fit may be used.

The adsorbent filter assembly 40 may include an annular fixing portion. In this case, the annular fixing portion is fixed to the inner surface of the bottom wall 14 of the case body 20A throughout the circumference. Thus, the adsorbent filter assembly 40 is stably fixed to the case body 20A.

When the adsorbent filter 46 has a high rigidity, the adsorbent filter 46 may be directly fixed to the bottom wall 14 of the case body 20A.

The distal end of the adsorbent filter 46 may extend into the cap 30.

When the holding member 41 is molded from a resin, the adsorbent filter 46 may be inserted so that the holding member 41 is molded as a single component including the adsorbent filter 46.

The above embodiments are intended to be illustrative, and the present invention is not limited to the above-described embodiments. Various alternatives, modifications and variations are possible to the disclosed exemplary embodiments without departing from the spirit and scope of the present invention. For example, the subject matter of the present invention may exist in fewer features than all of the features of the particular embodiments disclosed. The claims are incorporated into the detailed description and each claim by itself claims a separate embodiment. The scope of the invention is intended to embrace all such alternatives, modifications and variations, along with all equivalents thereof, within the scope of the claims.

The invention claimed is:

1. A cylindrical air cleaner for an internal combustion engine arranged in an intake air passage of the internal combustion engine, the cylindrical air cleaner comprising:
   a cylindrical housing including a circumferential wall having an inlet, a top wall having an outlet, and a bottom wall opposed to the top wall; and
   a tubular filter element accommodated in the housing, wherein
   the housing comprises a case including the bottom wall and a cap including the top wall, the cap being coupled to the case in a removable manner,
   the case includes a planar adsorbent filter to adsorb evaporated fuel of the internal combustion engine,
   the adsorbent filter includes a basal end portion fixed to an inner surface of the bottom wall,
   the adsorbent filter is located at an inner side of the filter element and extends in an axial direction of the filter element, and
   an inner surface of the filter element is spaced apart from each of opposite planes of the adsorbent filter by a gap that allows air to reach the outlet without passing through the adsorbent filter.

2. The cylindrical air cleaner according to claim 1, wherein the adsorbent filter includes a distal end located in the case.

3. The cylindrical air cleaner according to claim 1, wherein the case comprises:
   a case body including the bottom wall; and
   an adsorbent filter assembly including the adsorbent filter and a fixing portion arranged integrally with the adsorbent filter, wherein the fixing portion is fixed to the inner surface of the bottom wall.

4. The cylindrical air cleaner according to claim 3, wherein
   the adsorbent filter assembly includes a frame disposed about a periphery of the adsorbent filter,
   the frame includes two pillars extending in the axial direction of the filter element, and
   each of the two pillars tapers in width as the pillar extends distally from the fixing portion.

5. The cylindrical air cleaner according to claim 1, wherein
   the outlet includes an attachment slot used for attachment of an airflow meter, which detects an intake air amount, and
   the adsorbent filter is arranged parallel to a projection direction of the airflow meter, which projects through the attachment slot into the outlet.

6. The cylindrical air cleaner according to claim 3, wherein the inner surface of the bottom wall comprises a recess radially extending through a center of the bottom wall, and the fixing portion of the adsorbent filter assembly is inserted into the recess.

7. The cylindrical air cleaner according to claim 6, wherein the inner surface of the bottom wall further comprises an inner projection and an outer projection, the inner projection and the outer projection are annular and concentric about an axis of the case body, and the filter element is fitted between the inner projection and the outer projection.

* * * * *